(12) United States Patent
Ebeling

(10) Patent No.: US 9,717,319 B2
(45) Date of Patent: Aug. 1, 2017

(54) METHOD, DEVICE AND PACKING UNIT FOR PRODUCING A COSMETIC ITEM

(75) Inventor: Hilde Ebeling, Scheessel (DE)

(73) Assignee: David Lecas, Le Mans (FR)

( * ) Notice: Subject to any disclaimer, the term of this patent is extended or adjusted under 35 U.S.C. 154(b) by 1603 days.

(21) Appl. No.: 12/373,038

(22) PCT Filed: Jul. 11, 2007

(86) PCT No.: PCT/EP2007/006122
§ 371 (c)(1),
(2), (4) Date: Aug. 24, 2009

(87) PCT Pub. No.: WO2008/006553
PCT Pub. Date: Jan. 17, 2008

(65) Prior Publication Data
US 2010/0024361 A1 Feb. 4, 2010

(30) Foreign Application Priority Data
Jul. 11, 2006 (DE) .................... 10 2006 032 316

(51) Int. Cl.
*A45D 44/00* (2006.01)
*A45D 40/00* (2006.01)
(Continued)

(52) U.S. Cl.
CPC ............. *A45D 44/00* (2013.01); *A45D 40/00* (2013.01); *A45D 40/24* (2013.01); *B01F 5/10* (2013.01); *B01F 5/108* (2013.01); *B01F 15/0205* (2013.01); *B01F 15/0215* (2013.01); *B01F 15/065* (2013.01); *B65D 65/02* (2013.01); *B65D 81/3216* (2013.01); *G06Q 10/083* (2013.01); *G06Q 30/0621* (2013.01);
(Continued)

(58) Field of Classification Search
CPC .......................................... G06Q 30/00–30/08
USPC ....... 705/26.1–27.2; 700/106, 233, 239, 242, 700/265
See application file for complete search history.

(56) References Cited

U.S. PATENT DOCUMENTS 1,282,485 A 10/1918 Sterling
2002/0066750 A1* 6/2002 Albisetti ........................ 222/143
(Continued)

FOREIGN PATENT DOCUMENTS

DE 4110299 C1 3/1991
DE 202004011856 U1 1/2005
(Continued)

OTHER PUBLICATIONS

German Search Report.
Letter of Opposition, Simodoro (Feb. 3, 2012).
Notice of Opposition, EPO (Feb. 6, 2012).

*Primary Examiner* — Michael Misiaszek
(74) *Attorney, Agent, or Firm* — Laurence P. Colton; Smith Tempel Blaha LLC

(57) ABSTRACT

A method for producing a preferably cosmetic item. Furthermore, the invention relates to a device for producing preferably cosmetic items, and to a packing unit, in particular a capsule (33), for producing preferably cosmetic items. According to the invention, it is provided that the cosmetic ingredients (12) preferably required for production are available to a final consumer in precisely pre-measured units, in order for the final consumer to produce a domestic quantity of the preferably cosmetic item.

18 Claims, 4 Drawing Sheets

(51) Int. Cl.
 *B01F 5/10* (2006.01)
 *B01F 15/02* (2006.01)
 *B01F 15/06* (2006.01)
 *B65D 81/32* (2006.01)
 *G06Q 99/00* (2006.01)
 *A45D 40/24* (2006.01)
 *B65D 65/02* (2006.01)
 *G06Q 10/08* (2012.01)
 *G06Q 30/06* (2012.01)

(52) U.S. Cl.
 CPC ......... *G06Q 30/0635* (2013.01); *G06Q 99/00* (2013.01); *A45D 2040/0093* (2013.01); *A45D 2200/058* (2013.01); *B01F 2015/061* (2013.01); *B01F 2015/062* (2013.01); *B01F 2215/0031* (2013.01)

(56) References Cited

U.S. PATENT DOCUMENTS

| | | | |
|---|---|---|---|
| 2004/0202684 | A1 | 10/2004 | Djerassi |
| 2005/0021174 | A1* | 1/2005 | Wilmott et al. .............. 700/233 |

FOREIGN PATENT DOCUMENTS

| | | |
|---|---|---|
| EP | 0 839 736 A | 5/1998 |
| EP | 0 872 430 A | 10/1998 |
| EP | 0872430 B1 | 9/2003 |
| EP | 1431890 A1 | 6/2004 |
| FR | 2 876 356 A | 4/2006 |
| WO | 01/58238 A2 | 8/2001 |
| WO | 2006/024962 A2 | 3/2006 |

\* cited by examiner

Fig. 3
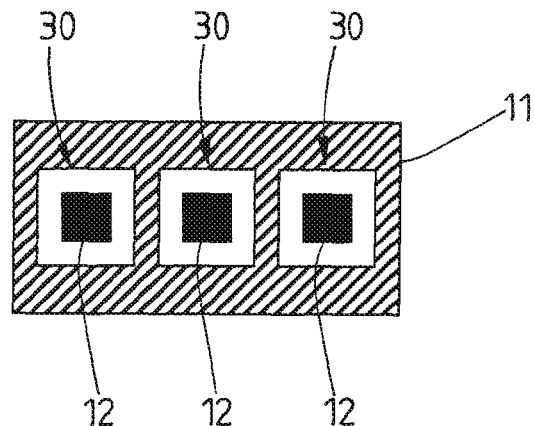
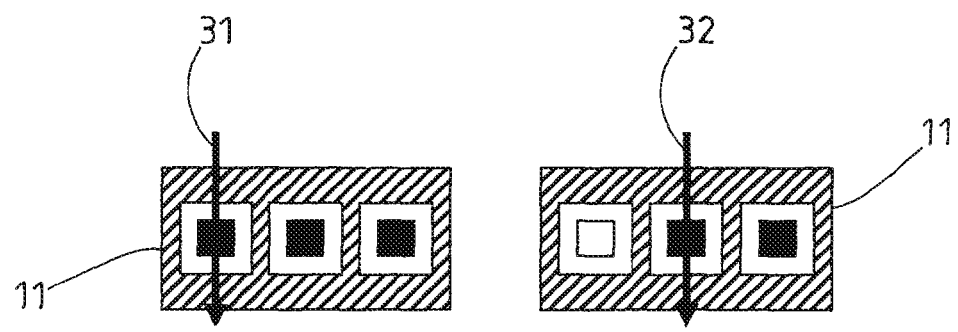
Fig. 4

METHOD, DEVICE AND PACKING UNIT FOR PRODUCING A COSMETIC ITEM

STATEMENT OF RELATED APPLICATIONS

This application is the U.S. National Phase Under Chapter II of the Patent Cooperation Treaty (PCT) of PCT International Application No. PCT/EP2005/006122 having an International Filing Date of 11 Jul. 2007, which claims priority on German Patent Application No. 10 2006 032 316.5 having a filing date of 11 Jul. 2006.

BACKGROUND OF THE INVENTION

1. Technical Field

The invention relates to a method for producing a cosmetic item. Furthermore, the invention relates to a corresponding device for producing a cosmetic article, and to packing unit containing cosmetic ingredients. A further aspect of the invention is the sale of pre-measured ingredients for producing cosmetic items.

2. Related Art

The cosmetic items mentioned at the beginning, such as, for example, creams, lotions or the like, are customarily sold to the final consumer as finished products. They are generally sold via cosmetic stores, drugstores, department stores or similar retail outlets. In these cases, the cosmetic articles are produced in appropriate factories away from the retail site and the consumer. Since some time passes between production and sale of the cosmetic articles, it is customary to add preservatives to the cosmetic items in order to extend the shelf life. In addition, cosmetic articles without preservatives and with a correspondingly shorter shelf life are occasionally also available.

As an alternative to the industrial production of cosmetic items, there is also the possibility of producing such items oneself with reference to recipes. The cosmetic ingredients from which the cosmetic item is essentially produced can be obtained via special drugstores. Preparation then takes place in situ at the premises of the final customer with reference to a recipe. A disadvantage of this solution is that the ingredients always have to be measured out.

DE 20 2004 011 856 U1 furthermore discloses a device for producing a care product, in which cosmetic products are kept ready in storage cartridges. Portions of the products are removed when required from the said storage cartridges by means of a regulating device and mixed in a mixing device. DE 41 10 299 C1 provides a similar solution. A disadvantage of these solutions is that the cosmetic products are stored in the storage cartridges and therefore either contain preservatives or have only a limited shelf life.

A pack for cosmetic products is furthermore known from U.S. Pat. No. 1,282,485. The pack comprises a lower part which has a plurality of hollow-like depressions for receiving cosmetic products. Said hollows are closed on the upper side by a cover mounted rotatably on the lower part. The cover has an opening, the dimensions of which approximately correspond to those of the hollows. By rotation of the cover, the opening can be placed over one of the hollows such that the required product can be removed as the need arises. This solution also has the disadvantage that the cosmetic products which are ready for use and are stored in the hollows either have to contain preservatives or have only a limited shelf life.

BRIEF SUMMARY OF THE INVENTION

Starting therefrom, the invention is based on the object of proposing a novel system for producing cosmetic articles. Further aspects of the invention reside in the provision of a suitable device for processing the ingredients and a suitable pack or packing unit for the ingredients.

A method for achieving this object is a method for producing a cosmetic item comprising cosmetic ingredients, wherein all of the cosmetic ingredients required for the production thereof are available in a packing unit to a final consumer and are mixed by the final consumer to form the cosmetic item, with the packing unit containing precisely pre-measured units of the cosmetic ingredients in order to produce precisely one domestic quantity of the cosmetic item. It is accordingly provided that the packing unit contains precisely pre-measured units of one or more (preferably all) of the ingredients for the final consumer to produce a domestic quantity of the cosmetic item. One advantage of said solution is that the final consumer does not have to weigh out or apportion the ingredients or portion or measure them out in another way. Instead, packing units which are ready for use and have preferably all of the ingredients precisely measured are provided to the final consumer. A domestic quantity of the item can then be produced from said ingredients.

A final consumer within the context of the invention is, of course, firstly to be understood as meaning the private customer who produces the item, for example at his/her own home. Secondly, however, a final consumer within the context of the invention can also be business customers, such as, for example, beauty salons, hairdressing salons, wellness centers, hospitals, chemists, doctors (dermatologists) or the like. A domestic quantity of the item can also be produced in this case and used immediately or sold for later use.

Since only relatively small quantities of the preferably cosmetic item are produced and also long delivery and storage times do not have to be taken into consideration, the addition of preservatives can be dispensed with. The preferably cosmetic items are produced in situ at the premises of the final consumer in a relatively simple process which requires little work by the customer.

Since the content of the packing unit is fully used up during the production of the domestic quantity of the preferably cosmetic product, the storage cartridges known from the prior art can be dispensed with.

Within the framework of this application, a domestic quantity can be understood in each case as meaning a quantity of the item in which said item is customarily dispensed to final consumers. However, the domestic quantity may also be a smaller quantity than the customary quantity in which the item is held ready for selling. For example, it is conceivable to produce just one portion for a single use of the cosmetic item. The size of the portion depends in turn essentially on the type of purpose of the cosmetic item.

Within the context of said application, cosmetic ingredients are understood as meaning the raw materials, in a preferably unmixed form, which are required for producing the cosmetic article.

All of the ingredients are preferably processed in precisely pre-measured quantity units. As a rule, water is also always required for producing the cosmetic item. Said water can also be supplied separately from the remaining cosmetic ingredients and, if appropriate, can be measured out individually. However, the required water or a corresponding different liquid is preferably provided together with the remaining unmixed raw materials in the packing unit.

It can furthermore be provided that, in addition to the customary ingredients which are required to produce the item, the final consumer has the option of adding further additives to the process in order, for example, to individualize the item to be produced. Additives of this type are not included either in the ingredients within the meaning of this application.

The packing unit can protect the raw materials or ingredients against moisture, light, dust and air. This then results in the raw materials or ingredients having a very long shelf life without the addition of preservatives being necessary.

In a preferred development of the method according to the invention, it is provided that a plurality of cosmetic ingredients are provided in pre-measured quantities in each case in a common packing unit, in particular in a capsule or the like, with one or more receiving spaces for in each case one or more cosmetic ingredients, wherein the quantities of cosmetic ingredients contained in the packing unit are precisely measured in order to produce the domestic quantity of the cosmetic item.

The advantages of this solution are obvious. The final consumer does not have to be concerned either with portioning the ingredients or with combining the same. All of the ingredients, assembled in a single packing unit, are provided to the final consumer. Since the ingredients are preferably contained in the packing unit separately from one another as unmixed raw materials, the addition of preservatives is essentially not required. Said pack or packing unit can preferable be processed with a special device which is discussed below.

A further advantage can be found in the fact that the packing units are only opened shortly before the contents thereof are processed. This can take place automatically in a special device. It is thereby possible to produce the items exclusively from natural materials, essentially without the use of preservatives.

Further details with regard to developments and preferred refinements of the method can be gathered from the dependent claims and the description and the drawings.

A packing unit for achieving the object mentioned at the beginning is a packing unit for producing a cosmetic item, wherein the packing unit comprises a capsule having an outer wrapping and a plurality of receiving spaces separated from one another by walls of the packing unit, wherein a pre-measured quantity of at least one cosmetic ingredient is contained in each receiving space, in order for a final consumer to produce a cosmetic product. According thereto, it is provided that the packing unit, in particular a capsule, for producing cosmetic items has an outer wrapping and a plurality of receiving spaces separated from one another by walls of the packing unit, wherein a pre-measured quantity preferably of a single cosmetic ingredient is contained in each receiving space, in order for a final consumer to produce a cosmetic item.

With the aid of said packing unit which optionally has a plurality of chambers, a domestic quantity of a desired cosmetic item can be produced in a simple manner by the method according to the invention and preferably with the aid of the device according to the invention, in particular without the final consumer having to measure out or portion the ingredients. In addition, the separation of the unmixed cosmetic raw materials means that no preservation is required.

One capsule preferably contains all of the ingredients for producing the item. The production of the cosmetic item is thereby very simple for the final consumer.

A device according to the invention for producing cosmetic items has means for receiving one or more packing units containing cosmetic ingredients, and is a device for producing a cosmetic item, wherein the device comprises a mixing chamber for receiving at least one packing unit, and the pre-measured cosmetic ingredients contained in the at least one packing unit are mixed in the chamber in order to produce precisely one domestic quantity of the cosmetic item.

It is preferably provided that the device has at least one heating and/or cooling device, a homogenizing device and a circulation line connecting at least some elements of the device, and a corresponding pump.

Further preferred developments of the device according to the invention can be gathered from the dependent claims and the description and the drawings.

Furthermore, protection is claimed for a method for selling pre-measured, preferably cosmetic ingredients for producing a domestic quantity of a preferably cosmetic item to at least one final consumer by a supplier in order to enable the final consumer to produce cosmetic items himself/herself, with a customary sales route being bypassed, comprising the following steps of:
  a) receiving a final consumer's order by the supplier, the order comprising at least the following information:
    details regarding the identity of the final consumer or the receiver of the order,
    details of the cosmetic, pre-measured ingredients (12) desired, and
    details regarding the number of cosmetic, pre-measured ingredients (12) desired,
  b) compiling the final consumer's order on the basis of the information specified,
  c) packing the final consumer's order for dispatch,
  d) arranging the dispatch of the order to the final consumer, and
  e) receiving the delivery by the receiver or final consumer for him/her to produce the cosmetic item by combining the cosmetic, pre-measured ingredients (12) without measuring out the ingredients (12).

BRIEF DESCRIPTION OF THE DRAWINGS

Preferred exemplary embodiments of the invention are described below with reference to the drawing, in which:

FIG. 3 shows, in a schematic section, an enlarged illustration of part of the device according to FIGS. 1 and 2, FIG. 4 shows a schematic illustration of the production of a cosmetic item during various phases of the production operation.

DETAILED DESCRIPTION OF PREFERRED EMBODIMENTS

Figure 1:
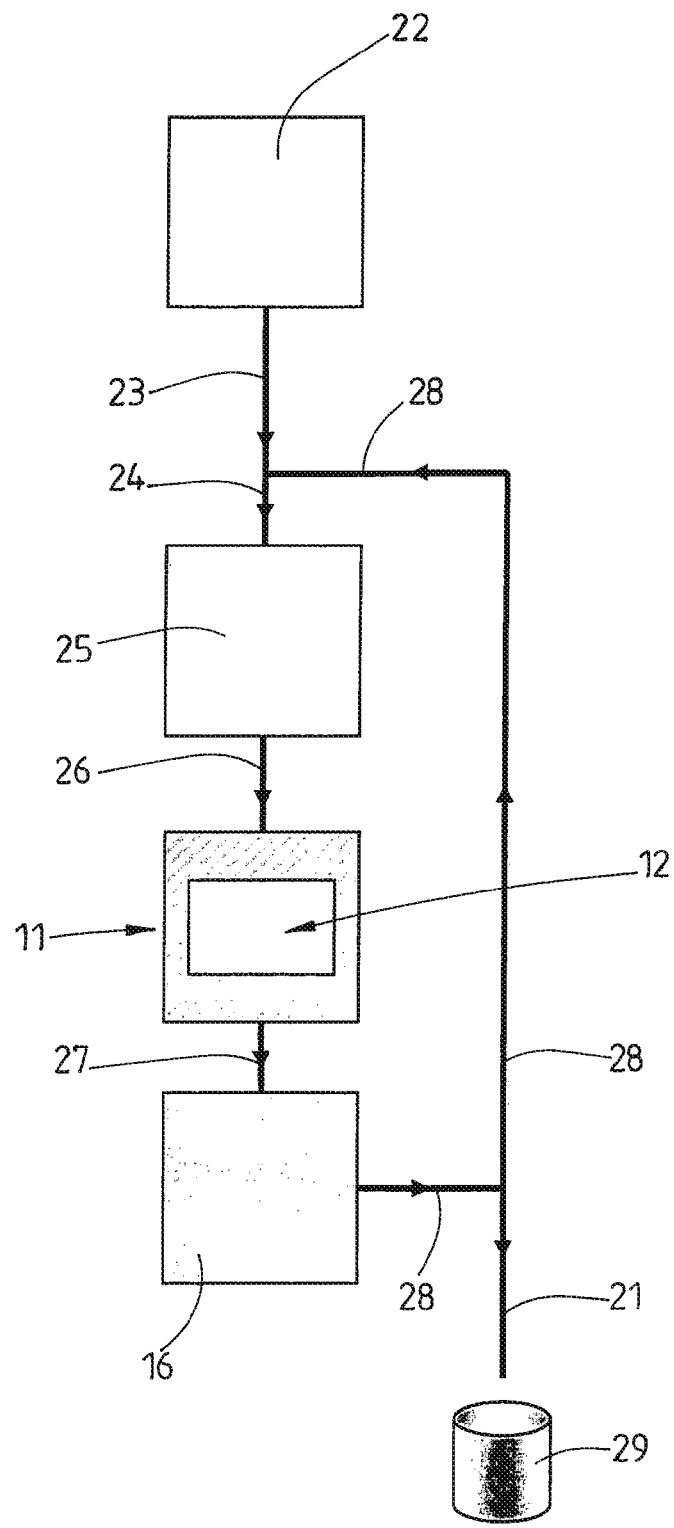
FIG. 1 shows a schematic illustration of a method and a device for producing cosmetic items from pre-measured, cosmetic ingredients.

The invention as shown in the figures essentially consists in that cosmetic items, such as, for example, creams, lotions, shampoos or the like, are produced in situ by the final consumer in small domestic quantities by means of a special device. The invention firstly relates to a special device with which the cosmetic items can be produced in a simple manner. Furthermore, the invention relates to a suitable production method. A further subject matter of the invention is a pack or packing unit for cosmetic ingredients, said pack or packing unit serving as a sales unit. In detail in this regard:

The basic concept of the present invention is for the cosmetic ingredients for producing the cosmetic article to be provided to the final consumer in precisely pre-measured quantities. The final consumer can produce a domestic quantity of the cosmetic item preferably with the aid of the device described below without having to be concerned with portioning or apportioning the cosmetic ingredients.

The cosmetic items under discussion here can be composed, for example, of a water phase and a fat phase. The water phase is generally heated to a certain temperature and dispersed with the fat phase. If appropriate, said process may also be reversed. After mixing the water phase with the fat phase, an emulsion is subsequently produced.

There are various options therefor which will be discussed below. After the emulsion is produced, it is cooled and further cosmetic ingredients are added. The addition of the further cosmetic ingredients can take place at different temperatures depending on the cosmetic item to be produced.

However, the invention is not restricted to the use in the production of items from emulsions. For example, during the production of gels, such as hair gel or shower gel, a solid phase (powder) is merely dispersed into a water phase. Products of this type can also be produced according to the invention.

In this case, a special characteristic consists in that the cosmetic ingredients which are required for producing the cosmetic item are provided in such a manner that, all in all, the cosmetic ingredients do not need to be weighed out or apportioned. For this purpose, packing or sales units in the form of capsules, which will also be discussed, are proposed below.

One advantage of the production method described is that, because of production in situ at the premises of the final customer, no preservatives have to be added. In addition, a further advantage is that, together with the special device and the special, pre-measured, cosmetic ingredients, recipes can also be sold to the final consumer. The number of cosmetic items which can be produced is expanded by developing new recipes. This also results in a further source of revenue in addition to the sale of the device and of the cosmetic ingredients.

A further advantage of the invention is that the final consumer can also have a direct influence on the composition of the cosmetic article to be produced. The final consumer can therefore adapt the cosmetic article, for example to personal preferences or personal requirements. For example, the production of a skin cream which is adapted to the final consumer's skin type, or a shampoo which is adapted to the final consumer's hair type, is conceivable. The option, for example, of individually adding fragrances, dyes or other additional substances, depending in each case on the final consumer's tastes, is also conceivable.

The production of the emulsion, i.e. the mixing of the water phase with the fat phase, can take place in various ways:
1. (High pressure) homogenization,
2. Homogenization according to the rotor/stator principle,
3. Homogenization according to the ultrasound principle,
4. Homogenization by means of a stirring device, and
5. Conventional mixing and stirring.

Figure 2:
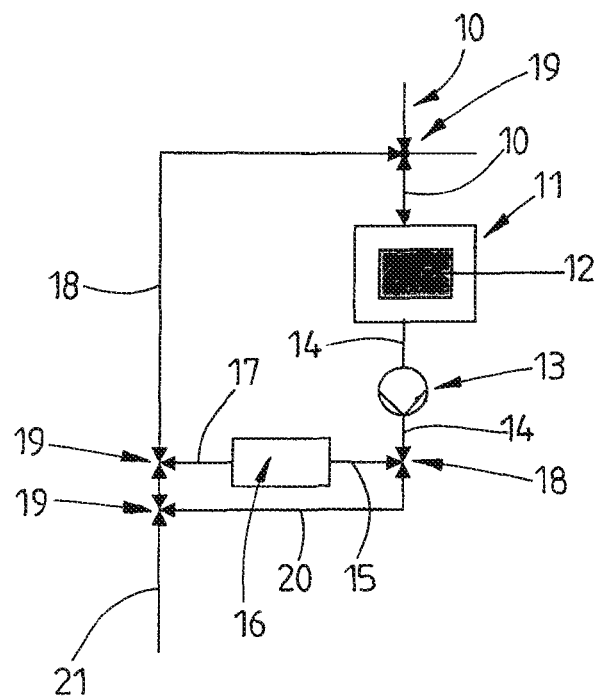
FIG. 2 shows, in a schematic illustration, an alternative method and an alternative device for the abovementioned purpose.

The basic production method and therefore implicitly also the basic construction of a suitable device emerge from the description below in conjunction with FIG. 2. Heated water is conducted into a chamber 11 via a supply line 10. The cosmetic ingredients 12 which are required for producing the cosmetic article are located in the chamber 11. The cosmetic ingredients 12 are heated to a predetermined temperature by the heated water in the chamber 11. The cosmetic ingredients 12 are then mixed with the water. The mixture produced in this manner is passed on by means of a pump 13 via further lines 14 and 15 to a homogenization device 16 in which the emulsion is produced. The mixture can be passed back again from the homogenization device 16 via further lines 17, 18 into the chamber 11 such that the mixture passes cyclically through the system until the desired product quality has been established.

After the desired product quality is achieved, the cosmetic item can be circulated through the system by means of the pump 13 until the mixture has cooled. Further ingredients can then be supplied to the chamber 11.

In order to heat the water, a heating device can be arranged upstream of the supply line 10. In order to be able to control the flow of material in the lines, valves 19 are provided in each case at the junction points of the lines. After the cosmetic item is finished, it is conveyed out via the line 20 and 21.

A further alternative device and a corresponding method are illustrated in FIG. 1:

Water is supplied by a separate water tank 22 via lines 23, 24 to a heating and/or cooling device 25. From there, the heated or cooled water passes via a further line 26 to the chamber 11 in which the cosmetic ingredients 12 are located at the beginning of the production process. A homogenization device 16 is subsequently connected to the chamber 11 via a further line 27. The product can be circulated again from the homogenization device 16 to the heating and/or cooling device 25 via circulation lines 28. As an alternative, the finished item can be supplied via a line 21 to a container 29.

Both devices operate in a substantially corresponding manner. In the case of the solution according to FIG. 1, a certain quantity of water is initially removed from the water tank 22 and initially heated in the device 25 to a temperature sufficient for producing the cosmetic item. The heated water is subsequently pumped into the chamber 11 and mixed there with the cosmetic ingredients 12. The mixture produced in this manner is subsequently processed in the homogenization device 16. This operation is repeated until the cosmetic item is completed. The item is subsequently conveyed via the line 21 into the container 29 and can be used by the final consumer.

A further preferred solution provides that the water required or an appropriate, different liquid does not come from a separate water tank but rather is already contained in the packing unit in addition to the other ingredients.

Figure 5:
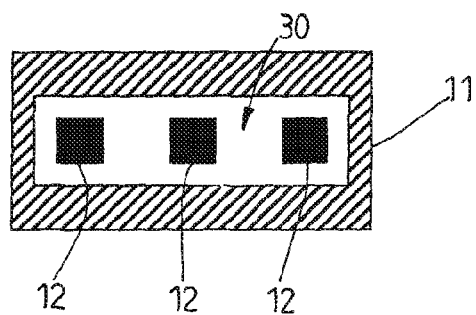
FIG. 5 shows, in a schematic sectional illustration, a packing unit for pre-measured, cosmetic ingredients.
Figure 6:
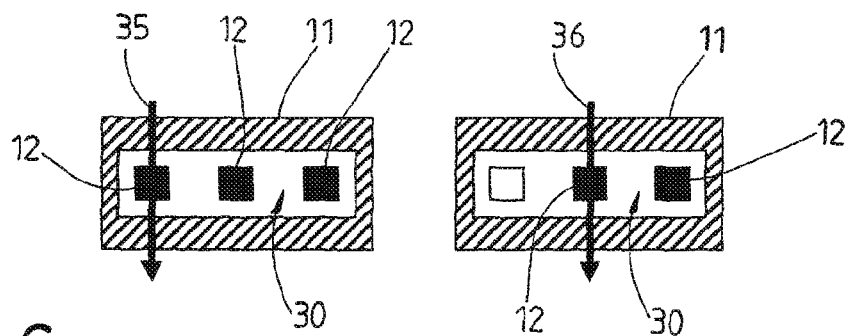
FIG. 6 shows a schematic illustration of the production of a cosmetic item together with a packing unit according to FIG. 5 during various phases of the production operation.
Figure 7:
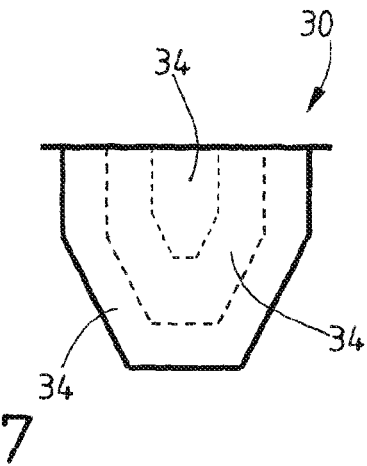
FIG. 7 shows a schematic vertical section through a packing unit according to FIGS. 5 and 6.

A further special characteristic of the invention emerges from FIGS. 3 and 4 and FIGS. 5-7. In detail in this regard:

If the cosmetic item is produced from a plurality of cosmetic ingredients 12, the latter generally have to be mixed successively with one another. This can take place during various phases of the production of the cosmetic item. In order to be able to produce cosmetic items of this type as simply as possible, a chamber 11 with a plurality of receiving spaces for different cosmetic ingredients 12 is proposed according to FIGS. 3 and 4. FIGS. 5 and 7 show an additional or alternative variant, in which the various cosmetic ingredients 12 are enclosed separately from one another in a common packing unit, namely a capsule 33. It is ensured by means of both solutions that the cosmetic ingredients 12 can be supplied independently of one another to the production process depending on the requirements of the recipe. The ingredients in this case are preferably unmixed raw materials.

In the case of the solution according to FIGS. 3 and 4, the chamber has three receiving spaces 30 in which at least one cosmetic ingredient 12 can be placed in each case. Each cosmetic ingredient 12 is preferably encased in a packing unit, for example in a capsule 33 or the like. The cosmetic ingredient 12 can thereby be initially heated by the heated water before it is mixed therewith or with another mixture. For this purpose, the particular capsule 33 or packing unit is then opened, and therefore the cosmetic ingredient 12 is released. The mixing then takes place. At a later time, one or more other capsules 33 can then be opened and mixed with the mixture.

For example, as shown in FIG. 4, the water phase can be prepared in a first step, namely by mixing the corresponding cosmetic ingredient 12 with a certain quantity of water. This operation is indicated by the arrow 31 in the left figure of FIG. 4. The mixture can subsequently be homogenized and, if appropriate, heated by the heating device 25. In order to open the capsule 33 containing the cosmetic ingredients 12 for the water phase in the chamber 11, said capsule can be exposed to an excessive water pressure or can be opened by mechanical stressing, such as, for example, by drilling a hole in the capsule, melting the capsule or destroying the capsule by means of a vacuum.

In a second step, the water phase could then be dispersed in the fat phase, in order to produce an emulsion, if this is required for the particular item to be produced. For this purpose, the second capsule 33 containing the cosmetic ingredients 12 for the fat phase in the chamber 11 would then be opened, as indicated by the arrow 32 in the right-hand illustration of FIG. 4. The second capsule 33 for the fat phase could be opened in the above-described manner, and therefore the corresponding cosmetic ingredients 12 are added to the water phase. An emulsion could then be produced therefrom by the two phases which are mixed with each other being circulated in the device. As an alternative, in the case of a capsule which contains all of the ingredients in separate receiving spaces, the individual receiving spaces can be opened successively, and therefore the ingredients can be mixed in the required sequence.

The final consumer can fill the individual receiving spaces 30 using the capsules 33 containing the cosmetic ingredients 12. As an alternative or in addition, the production device can also already be fitted with capsules 33 by the seller when first delivered. A magazine which is assigned to the device and is intended for different capsules 33 is also conceivable, as a result of which a stock of ingredients is kept ready. The individual capsules 33 can also be selected automatically with reference to a recipe or, if appropriate, with corresponding programming of the device by a certain item to be produced being selected at the device. The advantage of the solution according to the invention is clearly apparent: the final consumer does not have to weigh out or apportion the individual cosmetic ingredients individually, but merely has to place the required capsules 33 into the device and activate the latter. Upon corresponding programming of the device, the latter can also draw the required quantity of water out of the water tank 22 or the supply line 10. At the push of a button, the final customer therefore obtains a freshly prepared cosmetic item of his choice, the item not having to have any preservatives, since the cosmetic ingredients 12 can be sealed in the capsules 33 in a storable manner and the produced quantity of the cosmetic article can be used up within a corresponding time.

However, use is preferably made of just a single capsule which contains all of the required ingredients and which is completely emptied in order to produce the domestic quantity.

FIGS. 5-8 show a preferred variant of the chamber 11 with a plurality of receiving spaces 30 according to FIGS. 3 and 4. In this case, the chamber 11 has just one receiving space 30. The pre-measured cosmetic ingredients 12 are activated separately from one another in said receiving space 30. In the present case, this takes place by the cosmetic ingredients 12 being supplied in a common capsule 33 having a plurality of receiving spaces 34. The individual receiving spaces 34 are separated from one another, for example by walls of the capsule 33. The capsule 33 is introduced into the chamber 11 of the device, and the individual phases are released successively, as illustrated by the arrows 35 and 36 in FIG. 6 analogously to the illustration in FIG. 5. In this manner, the individual phases can be mixed successively with one another, as described above.

Figure 8:
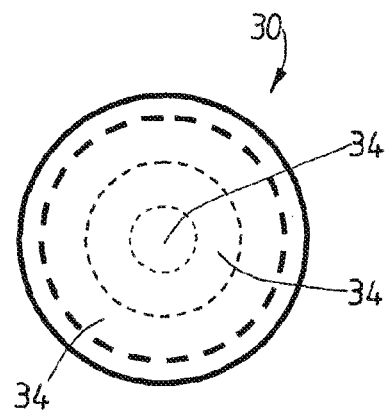
FIG. 8 shows a schematic horizontal section through a packing unit according to FIGS. 5 to 7.

In principle, of course, it is also conceivable for a plurality of capsules 33 shown in FIGS. 7 and 8 to be inserted into a device according to FIG. 3, in which the chamber 11 has a plurality of receiving spaces 30 for one capsule 33 in each case.

The capsules 33 shown in FIGS. 7 and 8 preferably contain all of the cosmetic ingredients 12 which are required for producing the cosmetic item.

The device for producing the cosmetic item should essentially have the following functions:
1. Heating,
2. Mixing/homogenizing,
3. Cooling,
4. Discharging,
5. Cleaning.

The heating device 25 serves to heat the water and also additional oil which may be required. Furthermore, the heating device 25 can be used in order to heat individual intermediate products or mixtures of various phases in accordance with the recipe during the production process.

The individual phases of the cosmetic ingredients 12 have to be mixed or homogenized. The same applies to dissolving or emulsifying, if required. For this purpose, the device can then also have corresponding functions. It goes without saying that the device according to the invention does not have to have all of the functions. For example, individual elements for realizing certain functions can be omitted if the particular intended purpose or the products to be produced do not require them. It is also conceivable, of course, for the device to have a certain excess of functions. Not all of the functions are then regularly required for the production of the items. However, the device then has additional functions with which special products can be produced.

The cooling device 25 can be used in respect of the cooling of the individual phases or mixtures thereof. As an alternative, the material to be cooled or the mixture thereof can be circulated in the apparatus until it cools by itself.

The cosmetic item can be directly discharged into a container made available by the final customer. The decanting preferably takes place under excessive pressure, for example using a pump or mechanically.

In order to clean the device, special cleaning capsules can be inserted into the apparatus, said cleaning capsules permitting the individual elements of the device to be cleaned or disinfected and/or sterilized.

A further aspect of the present invention resides in a special business model. The final customer may or has to initially acquire a suitable device for producing the cosmetic items. He/she can then furthermore acquire the pre-measured cosmetic ingredients 12 for producing the items. Furthermore, the final consumer can acquire the necessary recipes. Said items are preferably sold in the form of complete initial equipment and in the form of replacement and subsequently delivered items. The final consumer can be supplied directly by the manufacturer without intermediate distributors. For example, an online shop in which the customer can obtain individual cosmetic ingredients is conceivable. It is also conceivable for the customer to select the item to be produced and then for a shopping list containing the cosmetic ingredients required to be generated in the online shop. Said ingredients are then shipped to the final customer who can then produce the cosmetic item at home.

It is preferably furthermore provided that each customer can "store" his/her own recipes in the online shop and can retrieve them for repeat orders. Each customer can thereby create his/her own products and put in repeat orders for the same.

It goes without saying that the device described above and the capsules are merely exemplary embodiments of the invention. In this respect, they serve merely to explain the invention and are understood as non-limiting exemplary embodiments of the invention.

It goes without saying that other items can also be produced both by the method described and with the device described. For example, pharmaceutical items, food stuffs or the like are conceivable. Of course, other ingredients are then used and adapted method steps are possibly required in order to be able to produce the particular product. Essentially, however, use is always made of pre-measured units of the ingredients even for other products. The above exemplary embodiments are therefore also analogously favorable for producing alternative articles.

Furthermore, the packing units according to the invention can also be reused. For example, it is conceivable to send them back to the manufacturer or seller for direct re-filling, or for them to be used within the context of a deposit system.

LIST OF REFERENCE NUMBERS

10 Supply line
11 Chamber
12 Cosmetic ingredient
13 Pump
14 Line
15 Line
16 Homogenization device
17 Line
18 Line
19 Valve
20 Line
21 Line
22 Water tank
23 Line
24 Line
25 Heating and/or cooling device
26 Line
27 Line
28 Circulation line
29 Container
30 Receiving space
31 Arrow
32 Arrow
33 Capsule
34 Receiving space
35 Arrow
36 Arrow

The invention claimed is:

1. A method for producing a cosmetic item comprising cosmetic ingredients (12), comprising:
providing all of the cosmetic ingredients (12) required for the production of the cosmetic item in a packing unit to a final consumer, wherein the packing unit contains precisely pre-measured units of the cosmetic ingredients (12) in order to produce precisely one domestic quantity of the cosmetic item without quantities of the cosmetic ingredients (12) being apportioned or weighed out by the final consumer;
supplying at least one of the packing units by the final consumer to a device for automatically producing the cosmetic item and that prepares the cosmetic item automatically; and
activating the device for automatically producing the cosmetic item, resulting in the mixing of the cosmetic ingredients (12) with a mixing function in the device for automatically producing the cosmetic item so as to produce the one domestic quantity of the cosmetic item, wherein the one domestic quantity of the cosmetic item contains the entire content of the packing unit whereby the content of the packing unit is fully used up during the production of the one domestic quantity of the cosmetic item.

2. The method as claimed in claim 1, wherein a plurality of the cosmetic ingredients (12) are provided in pre-measured quantities in each case in a common packing unit, the common packing unit comprising a capsule (33) or the like, with at least one receiving spaces (34) for in each case at least one of the cosmetic ingredients (12).

3. The method as claimed in claim 1, wherein, upon activation of the device for automatically producing the cosmetic item by the final consumer, the precisely pre-measured cosmetic ingredients (12) or the packing units containing the precisely pre-measured cosmetic ingredients (12) are processed in situ in the device for automatically producing the cosmetic item so as to produce the one domestic quantity of the cosmetic item without the cosmetic ingredients being measured out, namely by fully using the cosmetic ingredients (12) contained in the packing unit.

4. The method as claimed in claim 1, wherein:
the packing unit comprises a capsule (33),
the packing unit further comprises an outer wrapping and a plurality of receiving spaces (34) separated from one another by walls of the packing unit, wherein a pre-measured quantity of at least one of the cosmetic ingredients (12) is contained in each of the plurality of receiving spaces (34), in order for a final consumer to activate the device for automatically producing the cosmetic item to produce the cosmetic item, and
the device for automatically producing the cosmetic item comprises a mixing chamber for receiving the at least one packing unit and the pre-measured cosmetic ingredients (12) contained in the at least one packing unit are mixed in the mixing chamber in order to produce precisely the one domestic quantity of the cosmetic item.

5. The method as claimed in claim 4, wherein the cosmetic ingredients (12) are measured precisely in order to produce the one domestic quantity of the cosmetic item, and further comprising a heating and/or cooling device (25), a homogenizing device (16), and circulation lines connecting at least some elements of the device for automatically producing the cosmetic item, and a corresponding pump (13).

6. A method for producing a cosmetic item comprising cosmetic ingredients (12), comprising:
providing a packing unit to a final consumer, the packing unit containing precisely pre-measured units of the cosmetic ingredients (12) in order to produce precisely one domestic quantity of the cosmetic item without quantities of the cosmetic ingredients (12) being apportioned or weighed out by the final consumer;
providing a device for automatically producing the cosmetic item for the final consumer, wherein the device for automatically producing the cosmetic item prepares the cosmetic item automatically;
the final consumer supplying at least one of the packing units to the device for automatically producing the cosmetic item; and
the final consumer activating the device for automatically producing the cosmetic item, resulting in the mixing of the cosmetic ingredients (12) automatically in the device for automatically producing the cosmetic item to form the one domestic quantity of the cosmetic item,
wherein all of the cosmetic ingredients (12) required for the production of the cosmetic item are in the packing unit and are mixed automatically in the device for automatically producing the cosmetic item to form the cosmetic item, and
wherein the one domestic quantity of the cosmetic item contains the entire content of the packing unit whereby the content of the packing unit is fully used up during the production of the one domestic quantity of the cosmetic item.

7. The method as claimed in claim 6, wherein a plurality of the cosmetic ingredients (12) are provided in pre-measured quantities in a common packing unit, the common packing unit comprising a capsule (33) with at least one receiving space (34) for at least one of the plurality of the cosmetic ingredients (12).

8. The method as claimed in claim 7, wherein, upon activation of the device for automatically producing the cosmetic item by the final consumer, the pre-measured quantities of the plurality of cosmetic ingredients (12), or the packing units containing the pre-measured quantities of the plurality of cosmetic ingredients (12), are processed in situ in the device for automatically producing the cosmetic item to form the one domestic quantity of the cosmetic item by fully using the cosmetic ingredients (12) contained in the packing unit without the cosmetic ingredients (12) being measured out.

9. The method as claimed in claim 6, wherein:
the packing unit comprises a capsule (33);
the packing unit further comprises an outer wrapping and a plurality of receiving spaces (34) separated from one another by walls of the packing unit, wherein a pre-measured quantity of at least one of the cosmetic ingredients (12) is contained in each of the plurality of receiving spaces (34), in order for the final consumer to activate the device for automatically producing the cosmetic item to produce the cosmetic item; and
the device for automatically producing the cosmetic item comprises a mixing chamber for receiving the at least one packing unit and the pre-measured cosmetic ingredients (12) contained in the at least one packing unit are mixed in the mixing chamber in order to produce precisely the one domestic quantity of the cosmetic item.

10. The method as claimed in claim 9, further comprising measuring the cosmetic ingredients (12) precisely in order to produce the one domestic quantity of the cosmetic item.

11. The method as claimed in claim 10, further comprising a heating and/or cooling device (25), a homogenizing device (16), and circulation lines connecting at least some elements of the device for automatically producing the cosmetic item, and a corresponding pump (13), for use in mixing the cosmetic ingredients (12).

12. The method as claimed in claim 1, wherein the device for automatically producing the cosmetic item prepares the cosmetic item automatically upon activation of the device for automatically producing the cosmetic item by the final consumer.

13. The method as claimed in claim 12, wherein the device for automatically producing the cosmetic item is activated by the final consumer by the push of a button.

14. The method as claimed in claim 1, wherein a required quantity of water for preparation of the cosmetic item is drawn out of a water tank.

15. The method as claimed in claim 6, wherein the device for automatically producing the cosmetic item prepares the cosmetic item automatically upon activation of the device for automatically producing the cosmetic item by the final consumer.

16. The method as claimed in claim 15, wherein the device for automatically producing the cosmetic item is activated by the final consumer by the push of a button.

17. The method as claimed in claim 6, wherein a required quantity of water for preparation of the cosmetic item is drawn out of a water tank.

18. The method as claimed in claim 1, wherein upon activation by the final consumer the packing unit is automatically supplied by the device for automatically producing the cosmetic item to the mixing function of the device in order to prepare the cosmetic item.

* * * * *